No. 775,911. PATENTED NOV. 29, 1904.
W. H. BARNES.
RAILWAY TICKET.
APPLICATION FILED JAN. 21, 1904.

NO MODEL. 2 SHEETS—SHEET 1.

NO, _____ a _____

APPLICATION.

TO THE _____ b _____ c

QUINCY ILL 1901

The undersigned hereby makes application for a credential for mileage rebate (or for pastors permit or for pass permit) as the case may be, and herewith attaches two miniature photographs of the applicant, one to be attached to the credential, permit, or pass, and one herewith attached to this application. I herewith agree for and in consideration of the priveleges granted, or tendered to submit to the conditions and agreements contained and printed on the credential, parson permit, issued for this application. I am a male (or female) person, age _____ years with (color) hair, a white or (give color) person, of the height (give height) and weight of (give weight) and speak the (give language) and am a native (if foreign born give country) and my complexion (give color) and the color of my eyes are (give color) and my distinguishable features consist in that (I am baldheaded or loss of limb or member giving such characteristics also as are apparent as to beard and mustache) and my place of residence is (give location) and my signature is here appended, and same I agree to sign on the credential, or pass, or permit, or wherever required for identification, and I accept this credential, pass, or permit, on the condition, and limitations hereon printed on the folder to be issued to me by reason of this application, wherefor I have hereunto signed my name in the presence of two witnesses residing at _____

Witnesses

B → d _____ _____ Autograph ← A

Fig I

Applicant will attach two unmounted pictures in spaces below forward to together with Signature, Address, Business and Residence.

Attach Photograph Here

Attach Photograph Here

STAMP HERE

C →

WITNESSES:

Wm. H. Doyle
J. S. Powers

D

Autograph

D

Autograph

William H. Barnes.
BY
INVENTOR

Attorneys

No. 775,911. PATENTED NOV. 29, 1904.
W. H. BARNES.
RAILWAY TICKET.
APPLICATION FILED JAN. 21, 1904.

NO MODEL. 2 SHEETS—SHEET 2.

*Fig. 2.*

| Photograph of Original Purchaser 808505 | Contract and Conditions 808505 | Good over Road below Specified 808505 |
|---|---|---|
| Here Photograph A' / STAMP B / C' Descriptive Features / Height Hair Beard Eyes Weight Sex Nationality } Distinguishing Characteristics | Here fill in stipulations / D' / This credential accepted by me upon the limitations and conditions hereon presented / Here signature of Purchaser or owner of credential / STAMP B' | Autograph | E' / Here fill in Rail Road / STAMP B' | Agent. |

WITNESSES:
W. F. Doyle
J. S. Powers

INVENTOR
William H. Barnes
by
_____ Attorney

No. 775,911.                                                                                   Patented November 29, 1904.

UNITED STATES PATENT OFFICE.

WILLIAM H. BARNES, OF CHICAGO, ILLINOIS.

RAILWAY-TICKET.

SPECIFICATION forming part of Letters Patent No. 775,911, dated November 29, 1904.

Application filed January 21, 1904. Serial No. 190,033. (No model.)

*To all whom it may concern:*

Be it known that I, WILLIAM H. BARNES, a citizen of the United States of America, residing at Chicago, in the county of Cook and State of Illinois, have invented certain new and useful Improvements in Railway-Tickets, of which the following is a specification, reference being had therein to the accompanying drawings.
Figure 1 is a plan view of the application-blank furnished by the agent or other in authority and which is to be filled in by applicant when desiring to purchase a ticket. Fig. 2 is a plan view of the credential furnished by agent or other in authority to the purchaser of ticket, being employed in connection with the identification of the traveler.

The primary object of my invention is to provide as a substitute for the well-known forms of railway-tickets and mileage-credentials a new form of ticket and mileage-credential, whereby mistakes and misunderstandings as well as the fraudulent use of tickets can be obviated; to prevent scalping of tickets and fraudulent use of credentials, and to make a more perfect ticket and credential, whereby the transportation companies can realize their just compensation for the passenger traffic sold and delivered by them.
Another object of my invention is to provide a method of recognizing and identifying the holder or purchaser of the credential, pass, or permit not only by his signature and photograph, but in addition thereto by the description that is required to be filled out in the application described and shown in Fig. 1 and which is counterparted in Fig. 2 as to identification by autograph, photograph, and description of person. Thus a person securing a ticket, credential, or pass is required to write his name to show that it corresponds to his signature contained in Figs. 1 and 2, and he or she must resemble the photograph and answer to the description of the descriptive features, thus avoiding any mistakes of identification.

The method of securing the ticket or credential shown in Fig. 1 is set forth in the application required to be signed and is designated by letter B, which gives the form of application. Letter A is the place where applicant for privilege signs his name or autograph. Letter C designates stamping-square for the place where agent is required to put the stamp of corporation or transportation company. Squares marked D D are for the purposes of pinning two (2) photographs of applicant to be furnished by him or her for privileges to be obtained under this method of securing transportation privileges, and to the spaces marked D in Fig. 1 he or she must attach two (2) photographs in the spaces shown by a pin, and thereafter the same can be more securely attached either to the application or privilege, whether pass or credential or ticket.

After the application set forth and described in the drawings under Fig. 1 has been filled out by the signature of applicant, witnesses, and the two (2) photographs of applicant attached thereto then the agent or transportation company will issue a form of credential or mileage-ticket or pass in conformity with and in exactness near so as to correspond with the application for the means of identification of the holder thereof.

The object of two photographs to be attached to the application marked in Fig. 1 in space D is for the purpose of holding the one for reference of the transportation company and the other for means of identification of the user of the credential, mileage, or pass holder, and the object of the signature to the application and to the credential, ticket, or pass is to aid the agent to the transportation companies in recognizing the holder thereof by requiring him or her to sign their names in proof of their identification.

Fig. 2 represents a form of credential issued on the application of Fig. 1, heretofore described. On the left of Fig. 2 there is a blank space to attach a photograph of applicant, (designated by letter A',) the stamp of the transportation company issuing same in space designated by letter B, and the descriptive features of the applicant under the letter designated C'. The next part of the same figure is to be filled out, the contract and conditions of the credentials, and is marked and designated by letter D' and is to be signed by applicant in space marked "Autograph." If same is over various lines of railroads or transportation companies, the same can be inserted in the right-hand space (marked and designated on Fig. 2 by the letter E) and signed by the agent who issued same and stamped by the transportation companies at place designated "Stamp" on both Figs. 1 and 2.

The complete systems of use may be more specifically set forth as follows: The application-blank is supplied to the would-be purchaser of a privilege by the local agent, ticket seller, general agent, or other person duly authorized by the company. This application-blank is given a number at the place $a$, designated at top of the blank or at any other desired place on the blank. At the place marked $b$ the name of the railroad or other companies issuing the application-blank is to be retained, stamped, or otherwise marked followed by the date of making application at $c$. The identification-data in space B is then filled in to correspond with the description of the applicant, this being done either by the applicant or by the issuing agent, as may be desired, and when done by the agent or by one in his office such data as is necessary to the proper filling in of the description is furnished by the applicant. The applicant is required to sign this blank at the three spaces marked A and D D, and two (2) witnesses to his or her signature is required at $d$. The agent or other issuing party officially stamps the application at C, and applicant must furnish two (2) photographs or other facsimile likeness, which are pinned or otherwise detachably connected for the time being to the spaces D D. This application-blank thus completed is to be retained by the issuer, (or sent by him to the auditor's office, as may be required,) and the agent or other party having authority to sell tickets then takes the "credential-blank," (illustrated in Fig. 2,) and which has an indicating member corresponding to that of the applicant, and detaching one of the photographs from one of spaces D (application-blank) affixes same (preferably by pasting or other means, so it may not be removed at will) in space A' or credential shown in Fig. 2. This credential is to be given to the purchaser of the ticket, the receiver of the pass, or any person who secures privilege from the company. The credential may be for convenience sake made in the form of a folder, and the issuing party affixes the stamp of the company at B' B' B' on the parts C', D', and E. Each of the parts C', D', and E have a number corresponding and also corresponding to the number on the application-blank. The issuing party indicates on the part C' the distinguishing features of the purchaser's personality or characteristics to conform to the descriptive data contained in space B of the application-blank. In the part D' of the credential the issuing party fills in any conditions or stipulations of the issuing company, subject to which the user of the ticket or other privilege secures the same, and this part D' is required to be signed by the applicant to agree with his or her signature affixed to the application-blank. In the part E of the credential the issuing party marks the lines over which the ticket purchased or pass issued may be used, affixes the stamp of the company to this part of the credential, and also affixes his own signature. This credential or certificate issued by the company therefore conforms to the application-blank, which is retained by them and is generally adapted to be issued in connection with any single or round trip ticket, mileage-book, or pass, though in the latter case it may serve as the pass itself by being issued by one having authority to issue it and mark it as a "pass." It thus forms a direct and positive identification of the person presenting the ticket or pass as being the proper person entitled to travel by virtue of the privilege and absolutely prevents "scalping" and frauds. The credential or certificate may not be renewed but once a year (or in any time that may be designated and required by the issuing company) and is always accompanied by the ticket, pass, or other privilege, or, in other words, the privilege issued is accompanied by the credential or certificate as a means of identification and is not in itself a privilege entitling the holder to transportation unless it is specifically so stated or designated in space D'. The conductor may require the traveler to show the credential or certificate if he has doubts as to the person holding the ticket being the one entitled to the privilege of traveling.

Figs. 1 and 2 correspond in identifying the applicant for the privileges secured by the autograph, photograph, and descriptive features, and hence all manner of frauds upon transportation companies are obviated. Besides this each credential or ticket is numbered, as is shown in Fig. 2 by number 808,505, and should be numbered consecutively. It is also a means whereby in case of injury or accident to the holder of such ticket, credential, or privilege the transportation companies may be saved from excessive loss in case of accident to persons who desire to recover excessive damages when such travelers are not sound or whole in body and also a means of identification of such persons should they be killed in an accident.

This ticket or credential, as shown in Fig. 2, represents a folder consisting of three (3) parts folding the same as an envelop. It may not be necessary to limit the same to this construction. However, the same can be placed all on a single sheet or other material.

What I claim is—

1. A check or identification means for railway-tickets comprising a numbered application-blank designated to receive a description of the applicant, the signature of the applicant, and the photograph of the applicant, in combination with a credential or certificate for possession by the user, said credential or certificate bearing a number, the photograph of the applicant or user, a description of the user, the signature of the user, the application-blank being for possession by the issuing transportation company and bearing a number identical with the number borne by said certificate or credential, said certificate or credential having three divisions, each correspondingly numbered, one of the divisions being designated to receive the "road" over which the ticket is issued for.

2. A combined railway-ticket and application for the same, the application containing a description of the applicant, and having detachably secured thereto duplicate photographs of the applicant, and bearing duplicate autographs of the applicant, and the ticket containing a description of the applicant, his autograph, and suitably designated to receive one of the photographs detachably secured to the application.

In testimony whereof I affix my signature in the presence of two witnesses.

WILLIAM H. BARNES.

Witnesses:
  LOUIS H. BERGER,
  SIMON BERGER.